United States Patent
Jeon

(10) Patent No.: US 9,569,389 B2
(45) Date of Patent: Feb. 14, 2017

(54) SEMICONDUCTOR SYSTEM FOR TUNING SKEW OF SEMICONDUCTOR CHIP

(71) Applicant: SK hynix inc., Icheon-si, Gyeonggi-do (KR)

(72) Inventor: Byung Deuk Jeon, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 461 days.

(21) Appl. No.: 14/225,600

(22) Filed: Mar. 26, 2014

(65) Prior Publication Data

US 2015/0153750 A1    Jun. 4, 2015

(30) Foreign Application Priority Data

Nov. 29, 2013 (KR) .......................... 10-2013-0147076

(51) Int. Cl.
*G06F 13/38*    (2006.01)
*G05F 1/46*    (2006.01)

(52) U.S. Cl.
CPC .............. *G06F 13/382* (2013.01); *G05F 1/468* (2013.01)

(58) Field of Classification Search
CPC ............ H01L 25/0652; H01L 25/0655; H01L 25/0657
See application file for complete search history.

(56) References Cited

U.S. PATENT DOCUMENTS

| | | | | |
|---|---|---|---|---|
| 8,692,561 B2* | 4/2014 | Cordero | .................... | G06F 1/10 324/601 |
| 8,713,384 B2* | 4/2014 | Jeon | .................... | G06F 11/2273 714/718 |
| 8,872,323 B2* | 10/2014 | Jeon | .................... | H01L 25/0657 257/686 |
| 9,000,490 B2* | 4/2015 | Vo | .................... | H01L 25/0652 257/209 |
| 2013/0038380 A1 | 2/2013 | Cordero et al. | | |
| 2013/0279276 A1* | 10/2013 | Schaefer | .................. | G11C 7/00 365/189.011 |

* cited by examiner

*Primary Examiner* — Jeffrey Zweizig
(74) *Attorney, Agent, or Firm* — William Park & Associates Ltd.

(57) ABSTRACT

A semiconductor system includes a master chip and a plurality of slave chips. The master chip controls internal voltage levels of the respective slave chips based on signals outputted from the plurality of slave chips such that, by referring to any one slave chip of the plurality of slave chips, internal voltage levels of remaining slave chips are controlled.

18 Claims, 6 Drawing Sheets

SEMICONDUCTOR SYSTEM FOR TUNING SKEW OF SEMICONDUCTOR CHIP

CROSS-REFERENCES TO RELATED APPLICATION

The present application claims priority under 35 U.S.C. §119(a) to Korean application number 10-2013-0147076, filed on Nov. 29, 2013, in the Korean Intellectual Property Office, which is incorporated herein by reference in its entirety.

BACKGROUND

1. Technical Field

Various embodiments relate to a semiconductor system, and more particularly, to a semiconductor system which is constituted by a master chip and a slave chip.

2. Related Art

In order to increase the capacity and the degree of integration of a semiconductor apparatus, a 3D (three-dimensional) semiconductor apparatus which includes a plurality of chips stacked and packaged in a single package has been developed. Recently, a through-silicon via (TSV) method has been used, in which a plurality of stacked chips are electrically coupled through TSVs.

FIG. 1 is a diagram schematically showing the configuration of a conventional semiconductor apparatus 10. In FIG. 1, the semiconductor apparatus 10 includes a master chip 11 and a plurality of slave chips 12. The master chip 11 may communicate with a host device and receive signals for controlling the respective slave chips 12. The master chip 11 may provide the signals received from the host device, to the slave chips 12, and may receive the data which are outputted from the slave chips 12.

The master chip 11 and the plurality of slave chips 12 may be stacked through through vias 13, 14, 15 and 16 and bumps 17. The through vias 13 and 14 of the slave chips 12 are electrically coupled in series and form data channels. The first through vias 13 of the slave chips 12 may form a first data channel DQ1, and the second through vias 14 of the slave chips 12 may form a second data channel DQ2. The slave chips 12 may include increased numbers of through vias and may be formed with increased numbers of data channels. The third through vias 15 may form a command channel CMD, and the slave chips 12 may receive a command signal through the command channel CMD from the master chip 11. The fourth through vias 16 may form an address channel ADD, and the slave chips 12 may receive an address signal through the address channel ADD from the master chip 11. The slave chips 12 may receive the command signal and the address signal from the master chip 11 and may output stored data to the master chip 11 through the first and second data channels DQ1 and DQ2. In this way, the slave chips 12 share the data channels DQ1 and DQ2, the command channel CMD and the address channel ADD.

Since it is difficult for the slave chips 12 constituting the semiconductor apparatus 10 to be manufactured under perfectly the same processing conditions, the slave chips 12 cannot help but have processing skews. For example, in the case where a lowermost stacked slave chip has an earliest processing skew and an uppermost stacked slave chip has a latest processing skew, times from when the master chip 11 provides the command signal to the slave chips 12 to when data are received from the respective slave chips 12 may have substantial errors. These errors may serve as factors that degrade the operation performance of the semiconductor apparatus.

SUMMARY

In an embodiment, a semiconductor system includes: a master chip; and a plurality of slave chips, wherein the master chip controls internal voltage levels of the respective slave chips based on signals outputted from the plurality of slave chips such that, by referring to any one slave chip of the plurality of slave chips, internal voltage levels of remaining slave chips are controlled.

In an embodiment a semiconductor system includes: a master chip; and a plurality of slave chips. The plurality of slave chips are divided into a plurality of ranks which share a data channel, and wherein the master chip control levels of internal voltages based on signals which are outputted from the plurality of ranks.

In an embodiment, a semiconductor system includes: a plurality of slave chips respectively including tuning blocks configured to output signals through allocated channels in response to a tuning enable signal and increase or decrease levels of internal voltages based on internal voltage control signals. The semiconductor system also includes: a master chip including a tuning control block configured to compare phases of the signals, generate the internal voltage control signals, and provide the internal voltage control signals to the plurality of slave chips.

In an embodiment: a system comprises: a processor; a controller configured to receive a request and a data from the processor; and a memory unit configured to receive the request and the data from the controller. The memory unit includes: a master chip and a plurality of slave chips. In addition, the master chip controls internal voltage levels of the respective slave chips based on signals outputted from the plurality of slave chips such that internal voltage levels of remaining slave chips are controlled.

DETAILED DESCRIPTION

Hereinafter, a semiconductor system for tuning the skew of a semiconductor chip will be described below with reference to the accompanying drawings through various embodiments.

Figure 1:
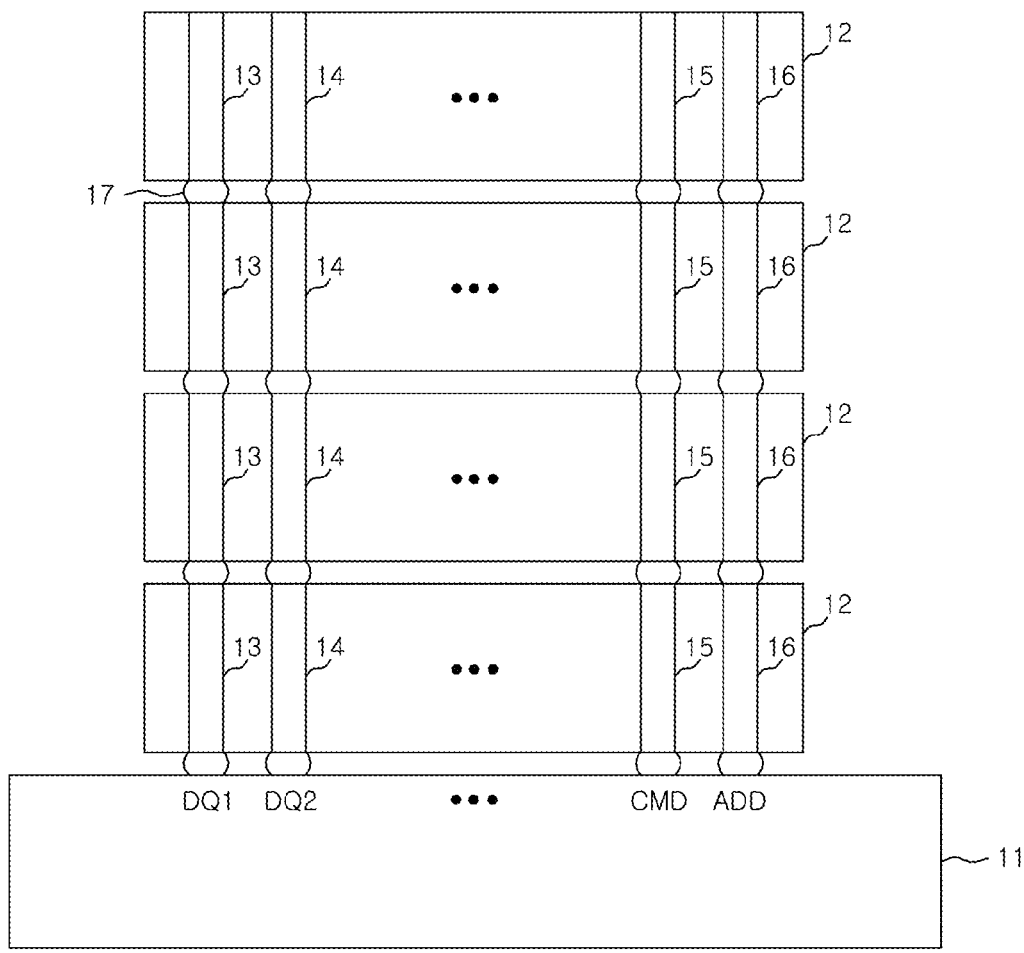
FIG. 1 is a diagram showing the configuration of a conventional semiconductor apparatus.
Figure 2:
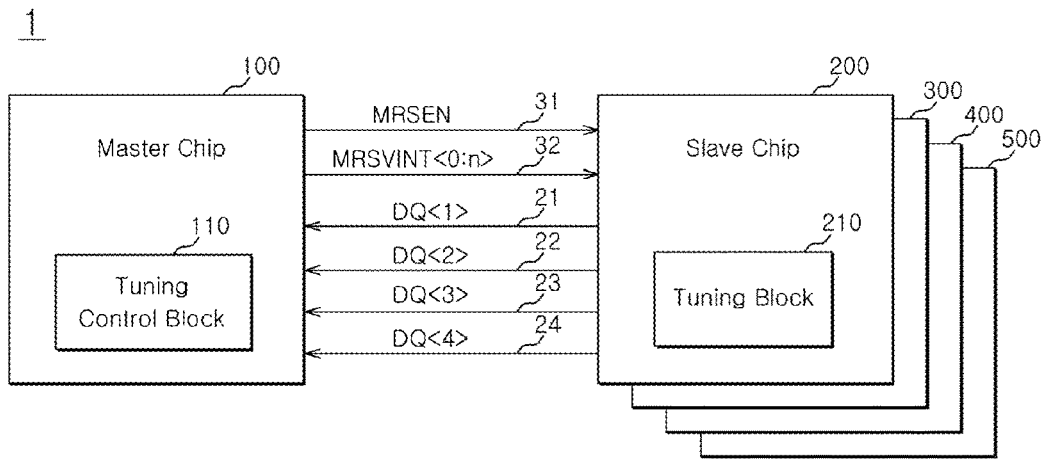
FIG. 2 is a diagram showing the configuration of a semiconductor system in accordance with an embodiment.

In FIG. 2, a semiconductor system 1 in accordance with an embodiment may include a master chip 100 and a plurality of slave chips 200 to 500. The master chip 100 may control operations of the plurality of slave chips 200 to 500. The master chip 100 may provide a command signal, an address signal, a clock signal, etc. to control the operations of the plurality of slave chips 200 to 500. The plurality of slave chips 200 to 500 may be controlled by the master chip 100 to store the data provided from the master chip 100 or output stored data to the master chip 100. The operation of the plurality of slave chips 200 to 500 to store the data provided from the master chip 100 may be a write operation; and the operation of the plurality of slave chips 200 to 500 to output stored data to the master chip 100 may be a read operation.

In an embodiment, the master chip 100 may be a processor or a memory controller which communicates with an external host device (not shown), and the slave chips 200 to 500 may be memory devices. The slave chips 200 to 500 may be commonly electrically coupled with the master chip 100 through a plurality of channels and/or buses. The plurality of channels may include a command channel, an address channel and a clock channel for respectively receiving the command signal, the address signal and the clock signal from the master chip 100. Also, the plurality of channels may further include a plurality of data channels for data transmission between the master chip 100 and the slave chips 200 to 500. The plurality of slave chips 200 to 500 may communicate with the master chip 100 by sharing the plurality of data channels.

In an embodiment, the plurality of slave chips 200 to 500 may be divided into a plurality of ranks, and the plurality of ranks may share the plurality of channels. The plurality of slave chips 200 to 500 may be divided into physical ranks or logical ranks. For example, in a physical rank division scheme, the plurality of slave chips 200 to 500 are divided into respective one ranks. The plurality of slave chips 200 to 500 may include memory banks capable of storing data. In a logical rank division scheme, a part of the memory banks of the plurality of slave chips 200 to 500 is grouped and divided into one rank; and the other parts of the memory banks of the plurality of slave chips 200 to 500 are grouped and divided into the other ranks. In FIG. 2, four slave chips 200 to 500 are shown. The four slave chips 200 to 500 may be respectively divided into first to fourth ranks. First to fourth data channels 21 to 24 may be shared by the first to fourth slave chips 200 to 500 or the first to fourth ranks.

The master chip 100 may receive the signals outputted from the plurality of slave chips 200 to 500, and may control the levels of internal voltages which are to be used in the respective slave chips 200 to 500, based on the received signals. The master chip 100 may receive the signals outputted from the plurality of slave chips 200 to 500 through the first to fourth data channels 21 to 24. The master chip 100 may receive a signal DQ<1> which is outputted from the first slave chip 200, through the first data channel 21, may receive a signal DQ<2> which is outputted from the second slave chip 300, through the second data channel 22; may receive a signal DQ<3> which is outputted from the third slave chip 400, through the third data channel 23; and may receive a signal DQ<4> which is outputted from the fourth slave chip 500, through the fourth data channel 24. In an embodiment, the master chip 100 may sequentially receive the signals outputted from the first to fourth slave chips 200 to 500 through the first data channel 21.

The master chip 100 may detect the phases of the signals DQ<1:4> which are outputted from the first to fourth slave chips 200 to 500; and may set the phase of the signal outputted from any one of the first to fourth slave chips 200 to 500, as a reference. The master chip 100 may lower the level of an internal voltage which is to be used in a slave chip which outputs a signal having a phase earlier than the phase set as the reference; and may raise the level of an internal voltage which is to be used in a slave chip which outputs a signal having a phase later than the phase set as the reference. For example, when the phase of the signal DQ<1> outputted from the first slave chip 200 is earliest and the phases of the signals DQ<2:4> outputted from the second to fourth slave chips 300 to 500 are sequentially later, the master chip 100 may set the phase of the signal DQ<3> outputted from the third slave chip 400, as a reference. Since the phases of the signals DQ<1:2> outputted from the first and second slave chips 200 and 300 are earlier than the phase of the signal DQ<3> outputted from the third slave chip 400, the master chip 100 may lower the levels of internal voltages which are to be used in the first and second slave chips 200 and 300. When lowering the levels of the internal voltages of the first and second slave chips 200 and 300, the master chip 100 lowers more the internal voltage of the first slave chip 200 such that the signals DQ<1:2> outputted from the first and second slave chips 200 and 300 have the same phase as the signal DQ<3> outputted from the third slave chip 400. Since the phase of the signal DQ<4> outputted from the fourth slave chip 500 is later than the phase of the signal DQ<3>, the master chip 100 may raise the level of an internal voltage which is to be used in the fourth slave chip 500. Accordingly, the phases of the signals DQ<1>, DQ<2> and DQ<4> respectively outputted from the first slave chip 200, the second slave chip 300 and the fourth slave chip 500 may become substantially the same with the phase of the signal DQ<3> outputted from the third slave chip 400.

In an embodiment, the master chip 100 may detect the phases of the signals DQ<1:4> which are outputted from the first to fourth slave chips 200 to 500; and may set a signal having a latest phase among the signals DQ<1:4> outputted from the first to fourth slave chips 200 to 500, as a reference. For example, if the signal DQ<4> outputted from the fourth slave chip 500 has a latest phase, the levels of internal voltages which are to be used in the first to third slave chips 200 to 400 are lowered such that the phases of the signals DQ<1:4> outputted from the first to fourth slave chips 200 to 500 may match one another.

In order to perform a tuning operation for matching the phases of the signals DQ<1:4> outputted from the respective slave chips 200 to 500 as described above, the master chip 100 may include a tuning control block 110. The tuning control block 110 may detect the phases of the signals DQ<1:4> outputted through the data channels 21 to 24 from the first to fourth slave chips 200 to 500; and may generate internal voltage control signals MRSVINT<0:n> for controlling the levels of internal voltages which are to be used in the first to fourth slave chips 200 to 500. Moreover, the tuning control block 110 may provide a tuning enable signal MRSEN to the respective slave chips 200 to 500 to perform the tuning operation. The tuning enable signal MRSEN and the internal voltage control signals MRSVINTf<0:n> may be transmitted to the slave chips 200 to 500 through command channels 31 and 32.

The first to fourth slave chips 200 to 500 may respectively include tuning blocks 210. The tuning blocks 210 may output the respective signals DQ<1:4> through the first to fourth data channels 21 to 24 in response to the tuning enable signal MRSEN. Further, the tuning blocks 210 may raise or lower the levels of internal voltages which are to be used in the respective slave chips 200 to 500, in response to the internal voltage control signals MRSVINT<0:n>.

Figure 3:
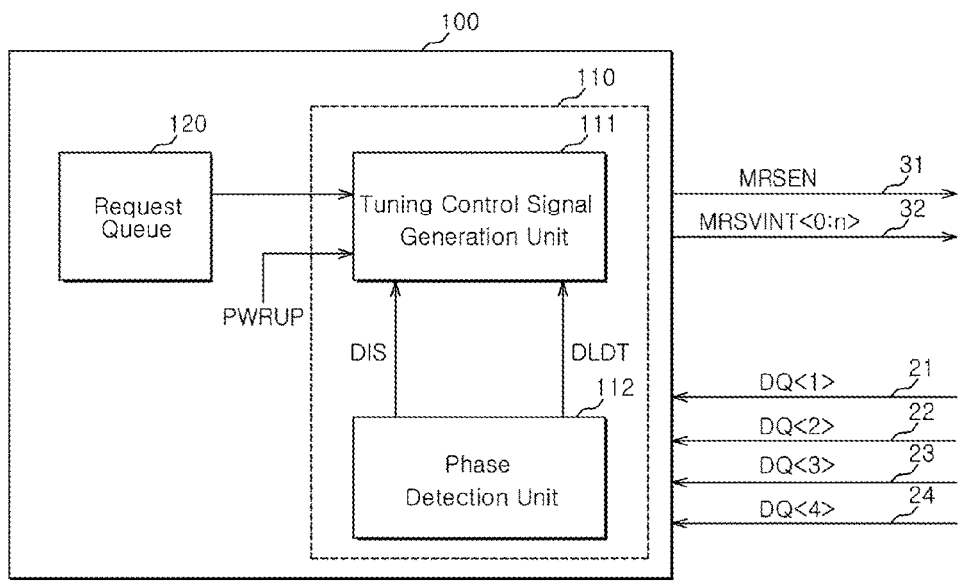
FIG. 3 is a diagram showing the configuration of an embodiment of the master chip shown in FIG. 2.

FIG. 3 is a diagram showing the configuration of an embodiment of the master chip 100 shown in FIG. 2. In FIG. 3, the tuning control block 110 of the master chip 100 may include a tuning control signal generation unit 111 and a phase detection unit 112. The tuning control signal generation unit 111 may generate the tuning enable signal MRSEN and provide the tuning enable signal MRSEN to the slave chips 200 to 500 when the master chip 100 is supplied with power and is thereby initialized. For example, the tuning control signal generation unit 111 may generate the tuning enable signal MRSEN in response to a power-up signal PWRUP which notifies initialization. Also, the tuning control signal generation unit 111 may generate the internal voltage control signals MRSVINT<0:n> based on a detection result of the phase detection unit 112 as will be described below.

The phase detection unit 112 receives the signals DQ<1:4> which are outputted from the respective slave chips 200 to 500, and compares the phases of the outputted signals DQ<1:4> inputted through the first to fourth data channels 21 to 24. The phase detection unit 112 may provide a phase comparison result DLDT of comparing the phases of the signals DQ<1:4> outputted from the slave chips 200 to 500, to the tuning control signal generation unit 111. The tuning control signal generation unit 111 may generate the internal voltage control signals MRSVINT<0:n> based on the phase comparison result DLDT which is provided by the phase detection unit 112. The internal voltage control signals MRSVINT<0:n> may be provided to the plurality of slave chips 200 to 500. The phase detection unit 112 may generate a tuning disable signal DIS when the phases of the signals DQ<1:4> outputted from the respective slave chips 200 to 500 are substantially the same with one another. The tuning control signal generation unit 111 may disable the tuning enable signal MRSEN in response to the tuning disable signal DIS.

In an embodiment, the tuning control signal generation unit 111 may utilize the configuration of mode register setting units for setting mode registers, which are disposed in the slave chips 200 to 500. In this case, the tuning enable signal MRSEN and the internal voltage control signals MRSVINT<0:n> may be provided to the slave chips 200 to 500 through the command channels 31 and 32, as mode register setting signals.

In FIG. 3, the master chip 100 may further include a request queue 120. The request queue 120 may receive a request which is transmitted from the host device outside the master chip 100. The request may include a request for performing the tuning operation. In this case, the tuning control signal generation unit 111 may generate the tuning enable signal MRSEN and the internal voltage control signals MRSVINT<0:n> by the request of the host device.

Figure 4:
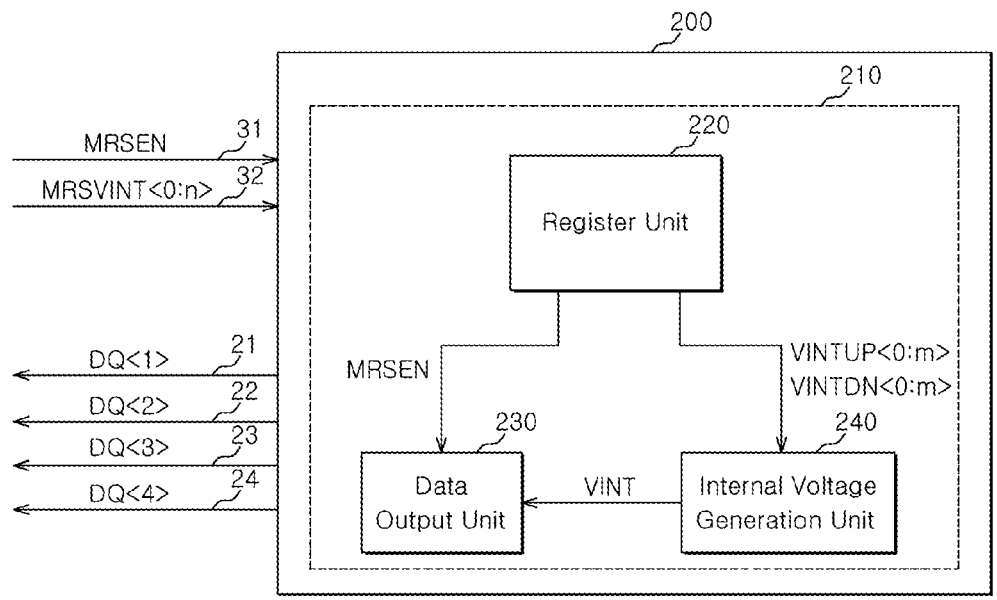
FIG. 4 is a diagram showing the configuration of an embodiment of the slave chip shown in FIG. 2.

FIG. 4 is a diagram showing the configuration of an embodiment of the slave chip shown in FIG. 2. In particular, FIG. 4 shows the configuration of an embodiment of the first slave chip 200. The second to fourth slave chips 300 to 500 shown in FIG. 2 may have substantially the same structure as the first slave chip 200 shown in FIG. 4. In FIG. 4, the tuning block 210 of the first slave chip 200 may include a register unit 220, a data output unit 230, and an internal voltage generation unit 240. The register unit 220 may receive the tuning enable signal MRSEN and the internal voltage control signals MRSVINT<0:n> from the master chip 100. The register unit 220 may store the tuning enable signal MRSEN and the internal voltage control signals MRSVINT<0:n>; may provide the tuning enable signal MRSEN to the data output unit 230; and may provide the internal voltage control signals MRSVINT<0:n> to the internal voltage generation unit 240. The register unit 220 may accordingly comprise a mode register. The register unit 220 may generate level control signals VINTUP<0:m> and VINTDN<0:m> based on the internal voltage control signals MRSVINT<0:n>; and may provide the level control signals VINTUP<0:m> and VINTDN<0:m> to the internal voltage generation unit 240. The level control signals VINTUP<0:m> and VINTDN<0:m> may include, for example, level up signals VINTUP<0:m> and level down signals VINTDN<0:m>.

The data output unit 230 may periodically output the signal DQ<1> to the master chip 100 in response to the tuning enable signal MRSEN. The data output unit 230 may periodically output a signal to the master chip 100 through an allocated data channel in order for the tuning operation, when the tuning enable signal MRSEN is enabled. The data output unit 230 of the first slave chip 200 may output the signal DQ<1> through the first data channel 21. A part or the entirety of circuits which constitute the data output unit 230 may use an internal voltage VINT as a power supply voltage. Similarly to the data output unit 230 of the first slave chip 200, the data output units of the second to fourth slave chips 200 to 500 may output the signals DQ<2:4> to the master chip 100 through the second to fourth data channels 22 to 24.

The internal voltage generation unit 240 generates the internal voltage VINT which may be used as a power supply voltage in the internal circuits of the first slave chip 200, including the data output unit 230. The internal voltage generation unit 240 may receive the level control signals VINTUP<0:m> and VINTDN<0:m> from the register unit 220 and control the level of the internal voltage VINT. The internal voltage generation unit 240 may raise the level of the internal voltage VINT in response to the level up signals VINTUP<0:m>, and may lower the level of the internal voltage VINT in response to the level down signals VINTDN<0:m>.

If the level of the internal voltage VINT generated by the internal voltage generation unit 240 rises, the data output unit 230 may output the signal DQ<1> which has a phase earlier than a previously outputted signal, to the master chip 100. If the level of the internal voltage VINT falls, the data output unit 230 may output the signal DQ<1> which has a phase later than a previously outputted signal, to the master chip 100.

Figure 5:
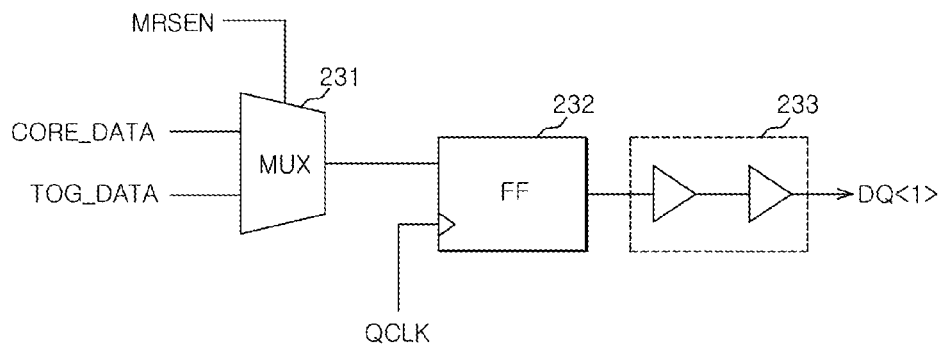
FIG. 5 is a diagram showing the configuration of an embodiment of the data output unit shown in FIG. 4.

FIG. 5 is a diagram showing the configuration of an embodiment of the data output unit 230 shown in FIG. 4. In FIG. 5, the data output unit 230 may include a multiplexer 231, a flip-flop 232, and a buffer section 233. The multiplexer 231 may output one of a signal CORE_DATA which is generated in a normal operation and a signal TOG_DATA which is generated in the tuning operation, in response to the tuning enable signal MRSEN. The multiplexer 231 may output the signal TOG_DATA which is generated in the tuning operation, when the tuning enable signal MRSEN is enabled; and may output the signal CORE_DATA which is generated in the normal operation, when the tuning enable signal MRSEN is disabled. In an embodiment, the normal operation may include read operations of the slave chips 200 to 500, and the signal CORE_DATA outputted in the normal operation may be the data stored in the slave chips 200 to 500. The flip-flop 232 may synchronize the output of the multiplexer 231 with an output clock signal QCLK. The output clock signal QCLK may be, for example, a signal which is generated internally of each of the slave chips 200 to 500 by delaying a clock signal CLK received from the master chip 100. The buffering section 233 may buffer the output of the flip-flop 232 and may transmit the buffered signal DQ<1> to the first data channel 21.

Figure 6:
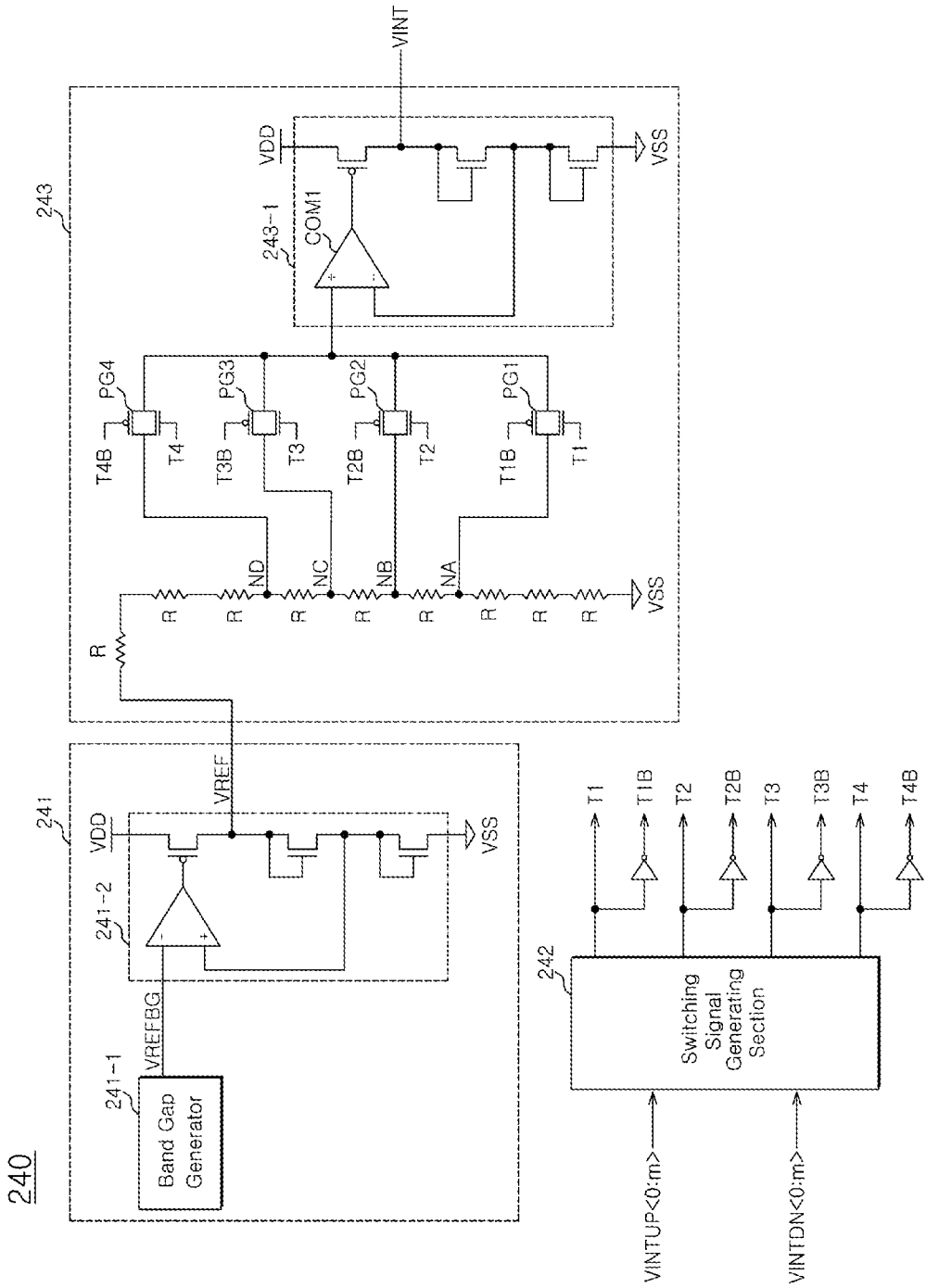
FIG. 6 is a diagram showing the configuration of an embodiment of the internal voltage generation unit shown in FIG. 4.

FIG. 6 is a diagram showing the configuration of an embodiment of the internal voltage generation unit 240 shown in FIG. 4. In FIG. 6, the internal voltage generation unit 240 may include a reference voltage generating section 241, a switching signal generating section 242, and a level control section 243. The reference voltage generating section 241 may include a band gap generator 241-1 and a first driver 241-2. The band gap generator 241-1 may generate a band gap reference voltage VREFBG. The first driver 241-2 generates a voltage which has substantially the same level as the band gap reference voltage VREFBG, as a reference voltage VREF. The reference voltage VREF generated by the reference voltage generating section 241 may be provided to the level control section 243. The level control section 243 may be configured to raise or lower the levels of the internal voltage VINT in response to the switching signals T1 to T4. The switching signal generating section 242 may receive the level control signals VINTUP<0:m> and VINTDN<0:m> from the register unit 220. The switching signal generating section 242 may generate a plurality of switching signals T1 to T4 and T1B to T4B based on the level control signals VINTUP<0:m> and VINTDN<0:m> and the internal voltage control signals MRSVINT<0:n>. In an embodiment, the switching signal generating section 242 may generate the switching signals T4 and T4B at default when power is supplied to the slave chips 200 to 500 and the slave chips 200 to 500 are initialized thereby. The switching signal generating section 242 may change the switching signals T1 to T4 and T1B to T4B which are to be enabled, in a stepwise manner, in response to the level control signals VINTUP<0:m> and VINTDN<0:m>. If the level down signals VINTDN<0:m> are inputted, the switching signals T3 and T3B may be enabled. Thereafter, if the level down signals VINTDN<0:m> are inputted again, the switching signals T2 and T2B may be enabled. Then, if the level up signals VINTUP<0:m> are inputted, the switching signals T3 and T3B may be enabled again.

The level control unit 243 may include a plurality of resistors R which are electrically coupled in series, a plurality of pass gates PG1, PG2, PG3 and PG4 which are electrically coupled with nodes NA, NB, NC and ND between the plurality of resistors R, and a second driver 243-1. As the reference voltage VREF is applied to the plurality of resistors R, the nodes NA, NB, NC and ND between the plurality of resistors R have voltage levels which gradually decrease. The voltage level of the node ND may be highest, and the voltage level of the node NA may be lowest. The plurality of pass gates PG1, PG2, PG3 and PG4 may be respectively electrically coupled with the nodes NA, NB, NC and ND between the plurality of resistors R, and may output the voltages of the corresponding nodes NA, NB, NC and ND in response to the switching signals T1 to T4 and T1B to T4B. If the pass gate PG4 is turned on in response to the switching signals T4 and T4B, a voltage of a highest level may be outputted; and if the pass gate PG1 is turned on in response to the switching signals T1 and T1B, a voltage of a lowest level may be outputted. The second driver 243-1 may output a voltage having substantially the same level as the voltage outputted from one of the plurality of pass gates PG1, PG2, PG3 and PG4, as the internal voltage VINT. Accordingly, the internal voltage generation unit 240 may raise or lower the level of the internal voltage VINT in response to the level control signals VINTUP<0:m> and VINTDN<0:m> which are provided from the register unit 220. FIG. 5 also illustrates a comparison signal COM1, and a ground voltage VSS and power supply voltage VDD.

Figure 7:
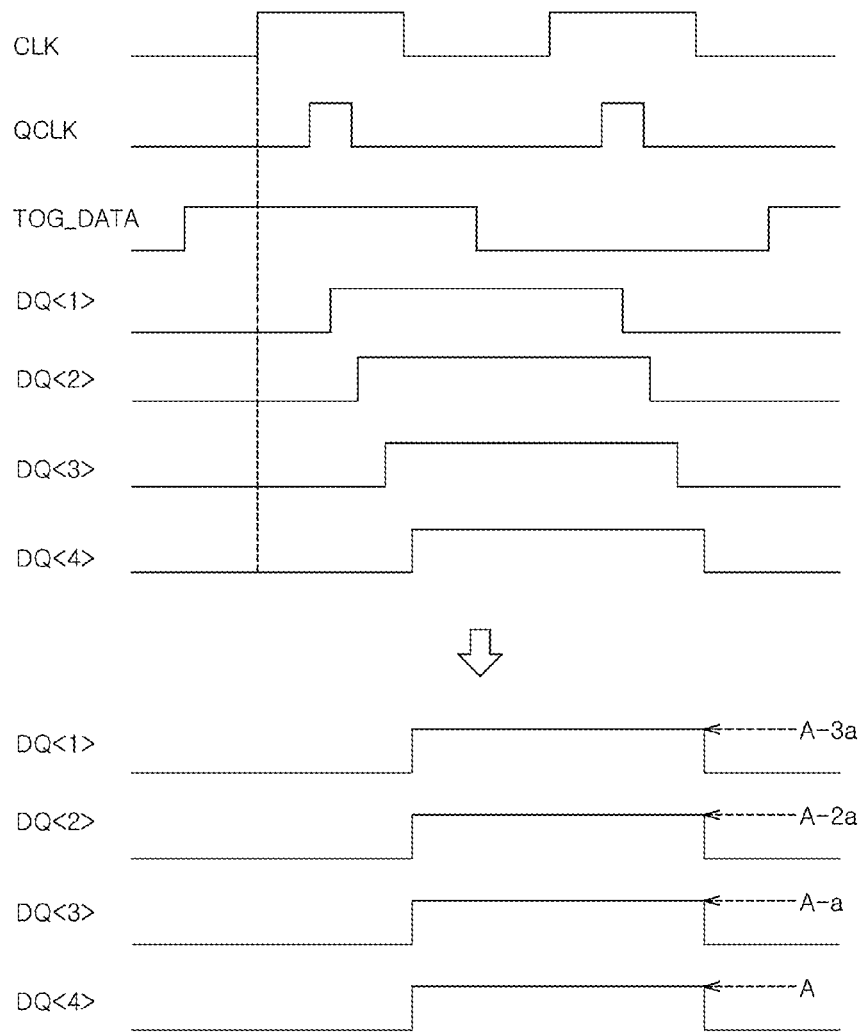
FIG. 7 is a diagram explaining operations of the semiconductor system in accordance with an embodiment.

FIG. 7 is a diagram explaining operations of the semiconductor system 1. Operations of the semiconductor system 1 in accordance with an embodiment will be described below with reference to FIGS. 2 to 7. If the master chip 100 and the slave chips 200 to 500 are initialized by being supplied with power, the tuning operation may be performed. The master chip 100 may provide the clock signal CLK to the slave chips 200 to 500, and the slave chips 200 to 500 may delay the clock signal CLK and generate the output clock signal QCLK. The tuning control signal generation unit 111 generates the tuning enable signal MRSEN and provides the tuning enable signal MRSEN to the slave chips 200 to 500. The register units of the slave chips 200 to 500 may provide the tuning enable signal MRSEN to the respective data output units; and the signal TOG_DATA, which is generated in the tuning operation, may be outputted from the slave chips 200 to 500 to the data channels 21 to 24 as the signals DQ<1:4>, in synchronization with the output clock signal QCLK.

It is assumed that, when compared to the clock signal CLK, the signal DQ<1> outputted from the first slave chip 200 and transmitted through the first data channel 21 has an earliest phase and the signal DQ<4> outputted from the fourth slave chip 500 and transmitted through the fourth data channel 24 has a latest phase. The phase detection unit 112 may compare the phases of the signals DQ<1:4> which are outputted through the respective data channels 21 to 24; and may provide the phase comparison result DLDT to the tuning control signal generation unit 111; and the tuning control signal generation unit 111 may generate the internal voltage control signals MRSVINT<0:n> based on the phase comparison result DLDT. Since the signal DQ<4> outputted from the fourth slave chip has a latest phase, the skews of the first to third slave chips 200 to 400 may be tuned to conform to the skew of the fourth slave chip 500.

The first to fourth slave chips 200 to 500 may set the internal voltage VINT to a predetermined voltage level A by receiving the outputs of the pass gates of the respective internal voltage generation units. For example, the internal voltage generation unit 240 may receive the level control signals VINTUP<0:m> and VINTDN<0:m> which are generated based on the internal voltage control signals MRSVINT<0:n> by the register unit 220. Since the skews of the first to third slave chips 200 to 400 are tuned to conform to the skew of the fourth slave chip 500 which outputs the signal DQ<4> having a latest phase, the internal voltage generation units of the first to third slave chips 200 to 400 receive the level down signals VINTDN<0:m> from the register units.

Since the first slave chip 200 outputs the signal DQ<1> which has an earliest phase, the internal voltage generation unit 240 of the first slave chip 200 may generate a voltage level A-3a which is lowered by 3 grades from the predetermined voltage level A, as the internal voltage VINT. Since the second slave chip 300 outputs the signal DQ<2> which has a second earliest phase, the internal voltage generation unit of the second slave chip 300 may generate a voltage level A-2a which is lowered by 2 grades from the predetermined voltage level A, as the internal voltage. Since the third slave chip 400 outputs the signal DQ<3> which has a third earliest phase, the internal voltage generation unit of the third slave chip 400 may generate a voltage level A-a which is lowered by 1 grade from the predetermined voltage level A, as the internal voltage.

As the internal voltages of the first to third slave chips 200 to 400 are lowered, the phases of the signals DQ<1:4> outputted from the first to fourth slave chips 200 to 500 may become substantially the same, and the phase detection unit 112 of the master chip 100 may generate the tuning disable signal DIS. The tuning control signal generation unit 111 may disable the tuning enable signal MRSEN in response to the tuning disable signal DIS; and thus, the tuning operation of the semiconductor system 1 may be completed.

Figure 8:
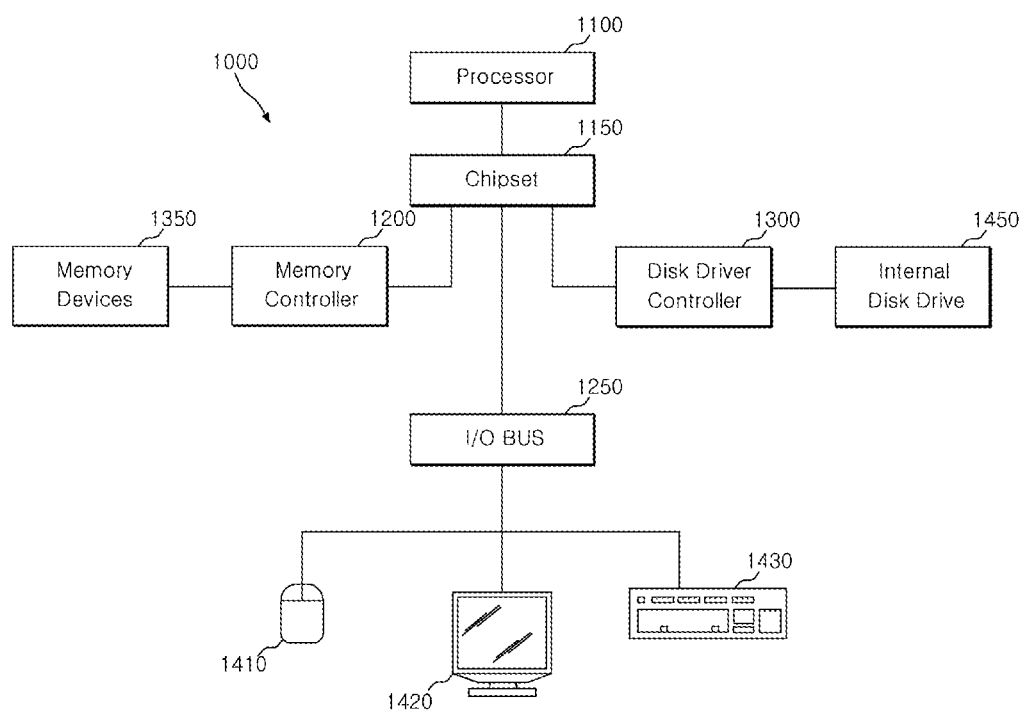
FIG. 8 illustrates a block diagram of a system employing a memory controller circuit in accordance with an embodiment.

Referring to FIG. 8, a system 1000 may include one or more processors 1100. The processor 1100 may be used individually or in combination with other processors. A chipset 1150 may be electrically coupled to the processor 1100. The chipset 1150 is a communication pathway for signals between the processor 1100 and other components of the system 1000. Other components of the system 1000 may include a memory controller 1200, an input/output ("I/O") bus 1250, and a disk drive controller 1300. Depending on the configuration of the system 1000, any one of a number of different signals may be transmitted through the chipset 1150.

The memory controller 1200 may be electrically coupled to the chipset 1150. The memory controller 1200 can receive a request provided from the processor 1100 through the chipset 1150. The memory controller 1200 may be electrically coupled to one or more memory devices 1350. The memory device 1350 may include the semiconductor system 1 described above.

The chipset 1150 may also be electrically coupled to the I/O bus 1250. The I/O bus 1250 may serve as a communication pathway for signals from the chipset 1150 to I/O devices 1410, 1420 and 1430. The I/O devices 1410, 1420 and 1430 may include a mouse 1410, a video display 1420, or a keyboard 1430. The I/O bus 1250 may employ any one of a number of communications protocols to communicate with the I/O devices 1410, 1420 and 1430.

The disk drive controller 1300 may also be electrically coupled to the chipset 1150. The disk drive controller 1300 may serve as the communication pathway between the chipset 1150 and one or more internal disk drives 1450. The disk drive controller 1300 and the internal disk drive 1450 may communicate with each other or with the chipset 110 using virtually any type of communication protocol.

While certain embodiments have been described above, it will be understood to those skilled in the art that the embodiments described are by way of example only. Accordingly, the semiconductor system for tuning the skew of a semiconductor chip described herein should not be limited based on the described embodiments. Rather, the semiconductor system for tuning the skew of a semiconductor chip described herein should only be limited in light of the claims that follow when taken in conjunction with the above description and accompanying drawings.

What is claimed is:

1. A semiconductor system comprising:
a master chip; and
a plurality of slave chips,
wherein the master chip controls internal voltage levels of the respective slave chips based on signals outputted from the plurality of slave chips such that, by referring to any one slave chip of the plurality of slave chips, internal voltage levels of remaining slave chips are controlled,
wherein, by referring to a phase of a signal outputted from one of the slave chips, the master chip lowers an internal voltage level of a slave chip which outputs a signal with a phase earlier than the referred phase, and raises an internal voltage level of a slave chip which outputs a signal with a phase later than the referred phase.

2. A semiconductor system comprising:
a master chip; and
a plurality of slave chips,
wherein the master chip controls internal voltage levels of the respective slave chips based on signals outputted from the plurality of slave chips such that, by referring to any one slave chip of the plurality of slave chips, internal voltage levels of remaining slave chips are controlled,
wherein, by referring to a signal with a latest phase among the signals outputted from the plurality of slave chips, the master chip lowers an internal voltage level of a slave chip which outputs a signal with a phase earlier than the latest phase.

3. A semiconductor system comprising:
a master chip; and
a plurality of slave chips,
wherein the plurality of slave chips are divided into a plurality of ranks which share a data channel, and
wherein the master chip control levels of internal voltages based on signals which are outputted from the plurality of ranks,
wherein, by referring to a phase of a signal outputted from one of the plurality of ranks, the master chip lowers a level of an internal voltage to be used in a rank which outputs a signal with a phase earlier than the phase referred to, and raises a level of an internal voltage to be used in another rank which outputs a signal with a phase later than the phase referred to.

4. A semiconductor system comprising:
a master chip; and
a plurality of slave chips,
wherein the plurality of slave chips are divided into a plurality of ranks which share a data channel, and
wherein the master chip control levels of internal voltages based on signals which are outputted from the plurality of ranks,
wherein, by referring to a signal with a latest phase among the signals outputted, the master chip lowers a level of an internal voltage to be used in a rank which outputs a signal with a phase earlier than the latest phase.

5. A semiconductor system comprising:
a plurality of slave chips respectively including tuning blocks configured to output signals through allocated channels in response to a tuning enable signal and increase or decrease levels of internal voltages based on internal voltage control signals; and
a master chip including a tuning control block configured to compare phases of the signals, generate the internal voltage control signals, and provide the internal voltage control signals to the plurality of slave chips.

6. The semiconductor system according to claim 5, wherein the tuning blocks comprise:
register units configured to store the tuning enable signal and the internal voltage control signals;
data output units configured to output the signals through the channels in response to the tuning enable signal; and internal voltage generation units configured to set levels of the internal voltages in response to the internal voltage control signals.

7. The semiconductor system according to claim 6, wherein the register units comprise mode registers.

8. The semiconductor system according to claim 6, wherein the data output units output data stored in the slave chips when the tuning enable signal is disabled.

9. The semiconductor system according to claim 6, wherein the internal voltage generation units comprise:
- switching signal generating sections configured to generate switching signals in response to the internal voltage control signals; and
- level control sections configured to lower or raise the levels of the internal voltages in response to the switching signals.

10. The semiconductor system according to claim 5, wherein the tuning control block comprises:
- a phase detection unit configured to compare the phases of the signals inputted through the channels, and generate a phase comparison result and a tuning disable signal; and
- a tuning control signal generation unit configured to generate the internal voltage control signals based on the phase comparison result.

11. The semiconductor system according to claim 10, wherein the tuning control signal generation unit enables the tuning enable signal in response to a power-up signal.

12. The semiconductor system according to claim 10, wherein the tuning control signal generation unit disables the tuning enable signal in response to the tuning disable signal.

13. The semiconductor system according to claim 10, wherein the tuning enable signal and the internal voltage control signals are transmitted to the plurality of slave chips through command channels.

14. The semiconductor system according to claim 10, wherein the master chip is configured to detect the phases from the plurality of slave chips and set one of the phases as a reference phase.

15. The semiconductor system according to claim 14, wherein the master chip is configured to lower one or more internal voltages to allow output signals from each of the plurality of slave chips to have an substantially equivalent phase.

16. The semiconductor system according to claim 5, wherein the tuning block generate the internal voltage control signals to control the internal voltages in the plurality of slave chips.

17. The semiconductor system according to claim 16, wherein the tuning control block is configured to raise or lower the levels of the internal voltages it response to the internal voltage control signals.

18. The semiconductor system according to claim 11, wherein the tuning control signal generation unit is configured to disable the tuning enable signal when the phases of the signals are substantially equivalent.

\* \* \* \* \*